Patented Nov. 11, 1930

1,780,927

UNITED STATES PATENT OFFICE

OTTO JORDAN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

LIQUID OF LOW FREEZING POINT FOR COOLING AND FOR SEALING VESSELS AND THE LIKE

No Drawing. Application filed March 9, 1927, Serial No. 174,091, and in Germany March 5, 1926.

Many substances have heretofore been proposed as additions to the cooling water contained for example in the cooling systems of automobiles in order to prevent freezing of the water. Additions of electrolytes have the disadvantage of appreciably corroding the metal of the cooling system even after being used for a short time. For this reason aqueous solutions of indifferent organic liquids especially such as alcohol, glycerol and glycol have been employed. Of these substances alcohol is very effective in lowering the freezing point of the cooling liquid but has a comparatively low boiling point; therefore it volatilizes rapidly so that the effect aimed at is quickly and considerably diminished. Glycerol and glycol, which are generally very suitable additions to cooling liquids, are difficultly volatilizable, but they increase considerably the specific gravity and viscosity of water, which may be undesirable for many purposes.

I have now found that the derivatives of glycols of the 1.3-glycol type, such as 1.3-butylene glycol and particularly the monoalkyl ethers of the said glycols of the 1.3-glycol type and their derivatives are particularly valuable for use as additions to cooling liquids meeting practically all requirements. The free glycols of the 1.3-glycol type containing at least four atoms of carbon in the molecule may also be advantageously employed for the said purpose. I have further found that not only the monoalkyl ethers of 1.3-glycols, but also those of other glycols whether of the 1.2- or 1.4- or any other type, may successfully be employed for the said purpose. The term "monoalkyl ethers of glycols" is herein used in a broad sense including the condensation products obtainable as by-products in the catalytic production of the said ethers from an alkylene oxid and an alcohol. It is not necessary to employ the said additions in a chemically or substantially pure state but the crude substances can be used without the effect being weakened. The aforesaid additions may be employed alone or in mixture ganic additions such as other glycols, polyglycols, glycerol, alcohols or the like.

The aqueous solutions of the substances in question have a low freezing point. For example an aqueous solution containing 35 per cent of ethylene glycol monomethyl ether does not solidify until at 17.5° C. below zero; an aqueous solution containing 50 per cent of 1.3-butylene glycol begins to solidify at 24.2° C. below zero. The solutions have a low vapor tension, they are not inflammable, nearly odorless, not poisonous and do not corrode metals, gum, varnish etc. at all or not more than water; they boil only a little higher than water, have a low density and viscosity and valuable calorific properties.

The said solutions can be used as cooling liquids in cooling systems of automobiles, aeroplanes etc., in refrigerating systems and the like and are also very suitable for use as sealing liquids in gasometers, gas-meters and the like, and may also be employed as heating media in hot water heating plants.

Suitable compositions may consist of from 90 to 40 per cent of water and 10 to 60 per cent of the desired monoalkyl ether of a glycol and the said ether may be replaced by a mixture of from 10 to 90 per cent thereof with a quantity of a glycol to make up 100 per cent.

I claim:

1. A liquid composition of low freezing point comprising water and a monoalkyl ether of a glycol.

2. A liquid composition of low freezing point comprising water, a monoalkyl ether of a glycol and another organic compound lowering the freezing point of water.

3. A liquid composition of low freezing point comprising water, a monoalkyl ether of ethylene glycol, and a glycol.

In testimony whereof I have hereunto set my hand.

OTTO JORDAN.